US008208946B2

(12) United States Patent
Smith et al.

(10) Patent No.: US 8,208,946 B2
(45) Date of Patent: Jun. 26, 2012

(54) METHOD, APPARATUS, AND SYSTEM FOR TRANSMITTING MESSAGES

(75) Inventors: Alan Andrew Smith, Farnborough (GB); Julie Stuart, legal representative, Longfield (GB); Devan Parekh, Farnborough (GB); Simon Staddon, Devon (GB)

(73) Assignee: Qualcomm Incorporated, San Diego, CA (US)

( * ) Notice: Subject to any disclaimer, the term of this patent is extended or adjusted under 35 U.S.C. 154(b) by 1036 days.

(21) Appl. No.: 11/492,610

(22) Filed: Jul. 24, 2006

(65) Prior Publication Data

US 2008/0020786 A1   Jan. 24, 2008

(51) Int. Cl.
*H04W 24/00* (2009.01)
(52) U.S. Cl. ............ 455/456.3; 455/466; 455/406; 455/456.6; 455/412.1; 455/404.2
(58) Field of Classification Search ............ 455/420, 455/426.1, 435.3, 440, 456.1, 457, 466, 412.1, 455/512, 521, 405–406, 414.1, 418, 459, 455/412.2; 709/230, 206–207, 201
See application file for complete search history.

(56) References Cited

U.S. PATENT DOCUMENTS

| 5,490,087 | A | | 2/1996 | Redden et al. |
|---|---|---|---|---|
| 5,542,116 | A | | 7/1996 | Schellinger |
| 5,617,539 | A | | 4/1997 | Ludwig et al. |
| 5,673,256 | A | * | 9/1997 | Maine ............ 370/271 |
| 5,761,621 | A | | 6/1998 | Sainton |
| 5,854,985 | A | | 12/1998 | Sainton et al. |
| 5,881,231 | A | | 3/1999 | Takagi et al. |
| 6,208,866 | B1 | * | 3/2001 | Rouhollahzadeh et al. ............ 455/456.5 |
| 6,243,039 | B1 | * | 6/2001 | Elliot ............ 342/457 |
| 6,351,647 | B1 | * | 2/2002 | Gustafsson ............ 455/466 |
| 6,381,465 | B1 | * | 4/2002 | Chern et al. ............ 455/466 |
| 6,400,711 | B1 | | 6/2002 | Pounds et al. |
| 6,421,434 | B1 | | 7/2002 | Rosu |
| 6,526,275 | B1 | * | 2/2003 | Calvert ............ 455/418 |
| 6,546,257 | B1 | * | 4/2003 | Stewart ............ 455/456.3 |
| 6,560,456 | B1 | * | 5/2003 | Lohtia et al. ............ 455/445 |
| 6,636,733 | B1 | * | 10/2003 | Helferich ............ 455/412.2 |
| 6,647,257 | B2 | * | 11/2003 | Owensby ............ 455/414.1 |
| 6,647,269 | B2 | * | 11/2003 | Hendrey et al. ............ 455/456.3 |
| 6,754,485 | B1 | * | 6/2004 | Obradovich et al. ...... 455/414.1 |

(Continued)

FOREIGN PATENT DOCUMENTS

EP   1617359   1/2006

(Continued)

OTHER PUBLICATIONS

International Search Report—PCT/US07/074270—International Search Authority—European Patent Office—Dec. 11, 2007.

(Continued)

*Primary Examiner* — Vladimir Magloire
*Assistant Examiner* — Babar Sarwar
(74) *Attorney, Agent, or Firm* — Abdollah Katbab

(57) ABSTRACT

A subscriber unit, for a cellular communication system, is arranged to store data representing a message to be transmitted together with data representing specified conditions associated with the transmission of the message. The subscriber unit responds to the specified conditions being met by transmitting the message. The specified conditions may be dictated by the network or by the user of the subscriber unit or by a combination of the two, and include time, date, location, and network loading.

69 Claims, 4 Drawing Sheets

U.S. PATENT DOCUMENTS

| | | | |
|---|---|---|---|
| 6,839,556 B2 * | 1/2005 | Malackowski et al. | 455/414.3 |
| 2001/0037240 A1 * | 11/2001 | Marks et al. | 705/14 |
| 2002/0112026 A1 * | 8/2002 | Fridman et al. | 709/217 |
| 2003/0065805 A1 * | 4/2003 | Barnes, Jr. | 709/231 |
| 2004/0092273 A1 * | 5/2004 | Valloppillil | 455/466 |
| 2004/0198390 A1 * | 10/2004 | Kaise | 455/456.1 |
| 2005/0055408 A1 * | 3/2005 | Dong | 709/206 |

FOREIGN PATENT DOCUMENTS

| | | |
|---|---|---|
| JP | 9018962 A | 1/1997 |
| JP | 2000102071 | 4/2000 |
| JP | 2005094229 A | 4/2005 |
| WO | 9739593 | 10/1997 |
| WO | 0182259 | 11/2001 |
| WO | 2006051304 | 5/2006 |

OTHER PUBLICATIONS

Taiwan Search Report—TW096126937—TIPO—Jul. 15, 2011.

Written Opinion—PCT/US07/074270—International Search Authority, European Patent Office—Nov. 12, 2007.

* cited by examiner

METHOD, APPARATUS, AND SYSTEM FOR TRANSMITTING MESSAGES

BACKGROUND

1. Field

The invention relates to a subscriber unit for a cellular communication system. The subscriber unit is operable to make data transmission based on specified conditions.

2. Background

For some time now cellular communication systems and other communication networks (referred to hereinafter simply as a "networks") have offered so-called SMS (short message service) services to subscribers. SMS messages are text based and have proved popular with younger users in many countries and regions. As networks migrate from established second-generation (2G) technology to the next generation technology (3G) more networks will additionally offer so-called MMS (multimedia message service) services.

As the name suggests, MMS messages comprise multimedia messages which contain text, audio files, graphics animation, etc. Examples of such messages in 2G systems include e-mail, web pages and still images. Upcoming 3G systems have the ability to support messages and applications that are more media rich, including multi-user gaming and the transmission and reception of multimedia data representing video, sound clips, movie fragments, etc.

As with text based SMS services, users are now able to create their own MMS messages, and send and receive them from their contacts. Furthermore, additional services are available that allow MMS messages with rich multimedia content to be received from commercial content creators.

Equivalents to these applications have been available on PCs for some time, but their transfer to a wireless mobile environment presents new challenges and opportunities. The migration of wireless networks to packet switching has made possible virtual connections which give rise to the possibility of so-called "bandwidth-on-demand." Packet switching can be employed to enable the user always to be connected to the network.

Although this increase in messaging capabilities brings many advantages, it will also bring with it a need for greater control over the transmission of SMS and MMS messages by the user, the network or both. From the perspective of the user cost is often a concern, and sending high data-volume messages, such as web pages, images and video, has the potential rapidly to incur high charges by the network. From the perspective of the network, the problem is one of loading. During peak times, the bursty nature of high data-volume messages may cause localized network loading problems, which, in turn, may affect the quality of service provided to users. This is going to increase as more users migrate towards multimedia-rich packet-based services.

The invention aims to overcome or at least mitigate the above and associated problems. To this end, the invention aims to provide for data transmission based on specified conditions. That is to say, an aim is to provide automatic activation of an SMS, MMS or other data transmission based on, among other things, any one or more of a date stamp, a time stamp, geographical position, or network loading. The specified conditions may therefore be dictated by the network or by the user of a subscriber unit or by a combination of the two.

SUMMARY

According to one aspect of the invention, there is provided a subscriber unit for a cellular communication system, which subscriber unit is arranged to store data representing a message to be transmitted together with data representing specified conditions associated with the transmission of the message, and to respond to the specified conditions being met by transmitting the message.

According to another aspect of the invention, there is provided a method of preparing a message for transmission in a cellular communication system, in which method data representing a message to be transmitted is stored in a subscriber unit together with data representing specified conditions associated with the transmission of the message, and the message is transmitted when the specified conditions are met.

According to a further aspect of the invention, there is provided a method of transmitting a message in a cellular network, the method comprising: generating message data representing a message to be transmitted; storing the message data; generating condition data defining one or more specified conditions associated with the transmission of the message represented by the message data; storing the condition data; determining when said one or more specified conditions are satisfied; and transmitting the message represented by the message data when said one or more specified conditions are satisfied.

The invention also provides an apparatus for transmitting a message in a cellular network, the apparatus comprising: means for generating message data representing a message to be transmitted; means for storing the message data; means for generating condition data defining one or more specified conditions associated with the transmission of the message represented by the message data; means for storing the condition data; means for determining when said one or more specified conditions are satisfied; and means for transmitting the message represented by the message data when said one or more specified conditions are satisfied.

The above and further features of the invention are set forth with particularity in the appended claims and together with advantages thereof will become clearer from consideration of the following detailed description of an exemplary embodiment of the invention given with reference to the accompanying drawings.

DETAILED DESCRIPTION

Figure 1:
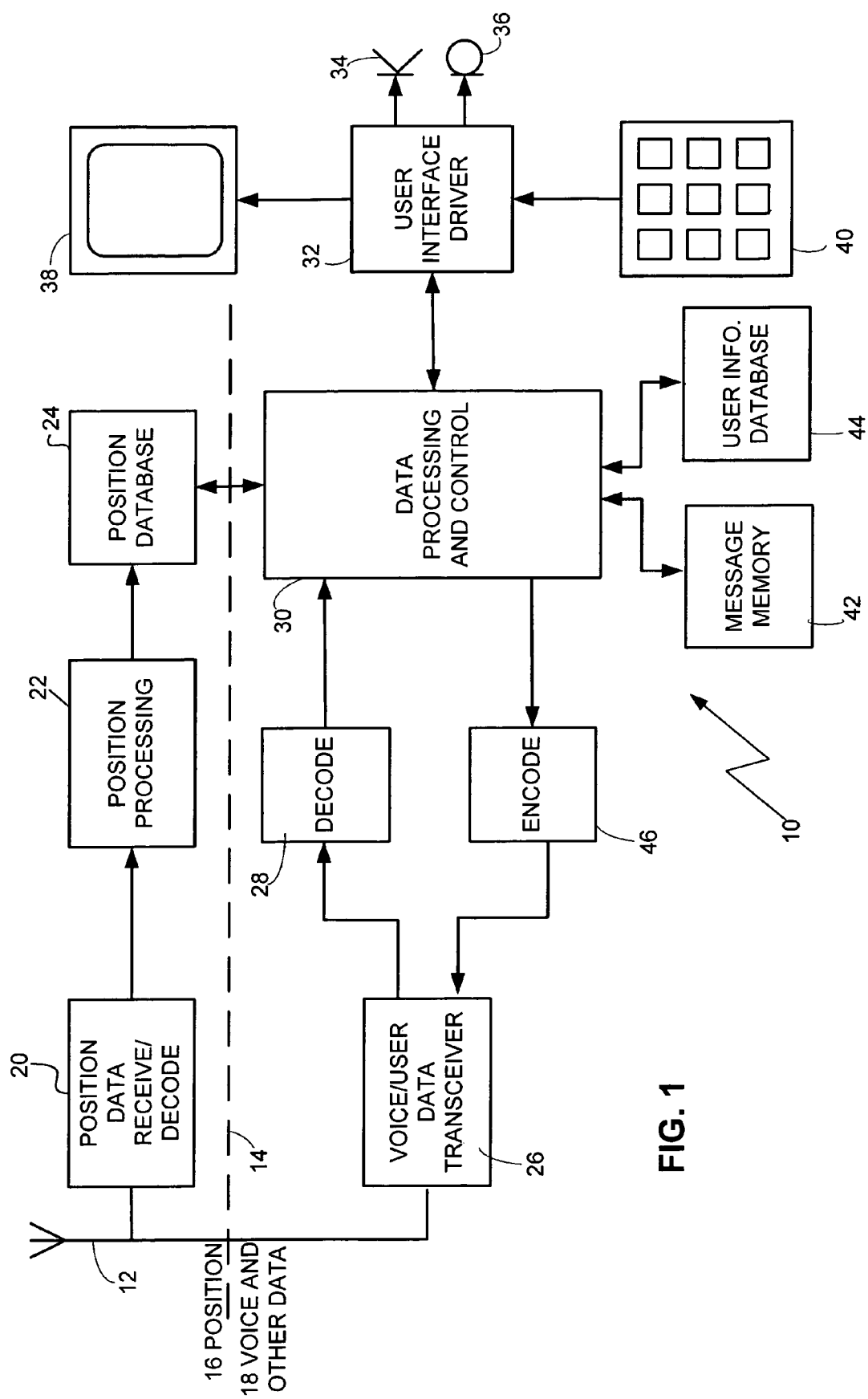
FIG. 1 is a schematic system diagram of a subscriber unit embodying the invention.

Turning now to FIG. 1 of the accompanying drawings, there is shown a schematic system diagram of a subscriber unit 10 embodying the invention. The term "subscriber unit" will be used herein, to refer to a device in a cellular system that interfaces with users of that system. The device may be a mobile or stationary device and need not be a single unit. Commonly, the "subscriber unit" will be a popularly called mobile phone or cell phone for use in a cellular network. However, the invention may be embodied in a device located in a fixed position and/or in a device that comprises several units that together perform the functions and operations described herein below.

The subscriber unit 10 comprises an antenna 12 for receiving signals from a cellular network (not shown in FIG. 1) and transmitting signals to the cellular network. For the purpose of this description, the subscriber unit 10 is shown divided by a broken line 14 into two paths 16, 18. The path 16 comprises functional units that together deal with position-related information received by the subscriber unit 10. The path 18 comprises functional units that together handle the transmission and reception of voice data and user data. This division is conceptual in nature and need not be implemented in a real-world device.

The division of the paths 16, 18 into functional units is a concept presented merely to facilitate understanding of the operation of the two paths. In practice, the paths need not be divided into the separate functional units as shown. The functions may be combined or divided further, the choice being, merely a matter of design by those possessed of the relevant skills.

The position data processing path 16 comprises a position data receive/decode unit 20 coupled to receive position signals from the antenna 12. The receiver/decoder unit 20 may be configured to receive position information from a number of different sources including the network (not shown) in which the subscriber unit operates in use, the global positioning system (GPS), or even the Galileo system slated for implementation in the not-too-distant future. These position-locating technologies are in themselves well known. The subscriber unit 10 uses data acquired through the GPS system using standard techniques that are familiar to those possessed of the appropriate skills. The GPS system and the acquisition of GPS data therefore will not be described in detail herein.

Position signals received from the antenna 12 are decoded by the receiver/decoder unit 20 before being passed to a position data processing unit 22 coupled thereto. The position data processing unit 22 extracts position-related information from the decoded signals and typically stores that as coordinate information in a position database 24.

In addition to the data from the position data processing path 16, the position database 24 stores data defining coordinates of predefined and/or user-selected locations. Data in the position database 24 may be preloaded into the store or may be input by the user. In addition to data defining coordinates of given locations, the data in the position database 24 includes data defining user assigned identifiers, i.e. name tags such as "home," "work," "office," "airport," etc. User selected data may be input to the position database 24 when the subscriber unit 10 is actually at the location. These user-defined names, each of which is associated with a set of GPS coordinates, form a database within the subscriber unit 10.

The term database is used herein simply as a label of convenience. The database could be as simple as a lookup table or as complicated as a relational database depending on the level of sophistication at which the subscriber unit is intended to operate. In most applications, the database will be much like an address book or phonebook except that it stores place information. It could therefore also be called a "place book".

Further description of the operations and functions performed by the position data processing path 16 is provided herein below. Those operations and functions are dependent on the operations and functions of the data transmission and reception path 18, to which this description will now turn.

The data transmission and reception path 18 comprises a voice/user data transceiver 26 coupled to receive signals representing voice and/or data from the antenna 12. The transceiver 26 is configured in use to receive signals from the network (not shown) in which it is operating. The transceiver 26 demodulates the received signals before passing them to a decoding unit 28 to which it is coupled. The decoding unit 28 decodes, i.e. extracts data from the demodulated signals and passes the extracted data to a data processing and control unit 30. The data processing and control unit 30 examines the data it receives from the decoding unit 28 and decides what to do with it.

If the data simply represents a voice signal, the data processing unit 30 may output the data directly to a user interface driver 32. The user interface driver 32 is coupled to a loudspeaker 34, a microphone 36, a display 38 and a keyboard 40, and thus provides various connections to the user in the real world. For a voice signal, the user interface 32 converts the voice data into an analogue signal and outputs that analogue signal to drive the loudspeaker 36. Thus the voice signal is reproduced as an audible output.

The received data may represent control signals for use in controlling operation of the subscriber unit. These control signals govern the transmission and reception of RF signals between the subscriber unit and the network (not shown). The control signals and the manner in which the subscriber unit responds to them are governed by various established communication standards. The invention is not specific to any particular standard. In the interest of brevity these control signals will not be described in further detail herein.

User data in the received signal follows the user data path 18 through the transceiver 26, the decoding unit 28 and the data processing and control unit 30. The user data may be a simple SMS message, such as a text message from another user (not shown) or billing information from the network, for example. The user data may be data representing an image (say a jpeg file), music (say an mp3 file), or an executable application (say a Java applet).

The data processing and control unit 30 processes the thus received user data and responds to it and/or stores it in a message memory 42 and/or a user information database 44. These two units 42, 44 are shown as separate units simply for ease of explanation. In practice, the units 42, 44 may be combined with each other and with the position database 24 in a single unit if so desired.

Depending on the nature of the data, the data processing and control unit 30 may also generate audio signals for output through the loudspeaker 34 as an audible waning to the user that data has been received. As well or instead of this, the control unit 30 may generate signals for output to the display 38 as a visible alert to the user. The display may also include instructions for recovering the data, typically by user manipulation of the keyboard 40. This type of user interaction is a simple matter of routine design and therefore need not be described in any greater detail herein.

Audio signals (i.e. typically speech) sensed by the microphone 36, are converted by the user interface driver 32 into speech data. The user interface driver therefore functions as a vocoder that converts voice signals into digital data in a format suitable for transmission. Communication systems are defined by different standards that specify, among other things, the manner in which a vocoder converts voice signals into data for transmission. The form of the vocoder is not germane to the invention and the invention is equally applicable to diverse standards. The vocoding function performed by the user interface driver will therefore not be described in any further detail herein.

The generation of SMS and MMS messages is controlled by user manipulation of the keyboard 40 and interaction with the user through the display 38. This type of user interaction is a simple matter of routine design and therefore need not be described in any greater detail herein. The resulting SMS/MMS message is stored as data in the message memory 42. Message data is held in the message memory for an appropriate period of time until a user-specified condition is met.

After editing, the subscriber unit 10 would offer a menu of options for transmission, such as:

(1) Time and date, for example send the message after 17:00 today, could be set up to remind the user or a third party to do something;

(2) Send when service becomes available, for example if the message is created in an area where service is not available; and (3) Proximity of the subscriber unit 10 to a location, for example within 10 miles of "home" as defined in the place book by the user.

When the user-specified conditions are met, the data representing the SMS/MMS message is transferred from the memory 42, through the control unit 30 to the encoder 46 for transmission by the transceiver 26. The encoder 46, together with the data processing and control unit 30, serves to encode the SMS/MMS data in a format suitable for transmission. The form of the data generated by the control unit 30 and encoder 46 is not germane to the invention. Moreover, the invention is equally applicable to diverse standards, and the form of the data generated by the control unit 30 and encoder 46 will therefore not be described in any further detail herein.

The subscriber unit 10 is operable under user control to delay the transmission of a user-generated message (SMS or MMS) until various conditions are met or one or more user-specified actions occur. Thus, the subscriber unit 10 is configured to enable a user to store an SMS/MMS message together with data identifying the conditions to be satisfied before the message will be sent. The subscriber unit 10 uses the trigger conditions above to determine when to transmit the SMS/MMS. Once the trigger condition is met, the condition changes to send now (or send as soon as possible). For example, if a message has the trigger condition "send after 17:00 today," then once 17:00 arrives, the condition becomes satisfied, and changes to "send now."

The "time and date" option would be useful for many situations. For example, a businessman could make notes on customer visits he has performed (or appointments made) during the course of a day and, at the end of the day, these summaries could be transmitted to his office for action to be taken there. This could also be used to take advantage of any off-peak tariffs. In this case, by simply setting a feature on the subscriber unit 10 menu, data would be automatically transferred during off peak hours or night times without any further user intervention.

The "send now" option would result in one of two responses. Firstly, if the subscriber unit 10 is in service, the message will be sent immediately. Secondly, if the subscriber unit 10 is not in service, the message will be sent as soon as network service is re-established without the need for user intervention. For example, to inform a third party meeting the user at an airport that the user has arrived and suggest a place to meet the user.

The "proximity" option would be useful to let a third party know when the user is close to home (while driving, etc.), or could be used to inform colleagues when the user is likely to arrive at work, etc.

The options could also be combined, such that a message could be sent, say, when both time and date conditions and proximity are met, e.g. after 17:00 today and within 10 km of "home."

Figure 2:
FIG. 2 is a graph showing a typical time-dependent loading pattern of a cellular network.

FIG. 2 of the accompanying drawings is a graph showing a typical loading pattern of a cellular network. As can be seen from the graph in FIG. 2, the network usage is very small during night hours and is high during business hours. With current voice services higher tariffs are applied during peak periods and users incur lower charges during off-peak periods. Thus, network loading may simply be a function of the time of day. For example, a network may define its peak time as between 7:00 am and 7:00 pm. Calls made during that time period would be charged at a premium rate, and calls made outside would be charged at an off-peak rate.

The network operators determine charges, and it is difficult to generalize about how individual operators will deal with charges for data transmission. Nevertheless, consistent with past charging for voice connections, it is likely that at least some operators will charge different tariffs at different times for data transmission. From the perspective of the user cost is often a concern, and sending high data-volume messages, such as web pages, images and video, has the potential rapidly to incur high charges by the network.

Consequently, a user of an MMS application may wish to delay the transmission of selected MMS messages until the off-peak period so as to take advantage of lower tariffs. Similarly, the user may wish to delay the reception of data from the network (e.g. file downloading from a remote server) until various conditions are met or one or more user-specified actions occur.

The subscriber unit 10 is therefore configured to enable the user to specify that the transmission of a message be delayed until one or more user-specified conditions are met. Those conditions include, but are not limited to: date, time, network loading and geographical position. The first two conditions are relatively straightforward. Through user interaction with the display 38 and keyboard 40, data defining a day and/or time is input and stored in the information database 44.

The data processing and control unit 30 is arranged to respond to those conditions being met by moving the relevant message from the message memory 42 to the encoder 46 for transmission over the network via the transceiver 26 and antenna 12. In the simplest case, the control unit 30 will monitor the current time (either based on information it receives from the network or on internally generated data, or both) and when the current time matches the time condition stored in the user information database 44. Whether the message is removed from the memory 42 once it has been sent is a matter of design choice, and is dependent on, among other things, the capacity of the memory, the physical size of the subscriber unit, and cost.

It is likely that more sophisticated applications will be required by the networks and/or users. Another option therefore would be to arrange the subscriber unit 10 to receive network-loading information from the network from time to time. Transmission of such information places a further load, albeit small, on the network. The regularity at which network-loading information is sent to the subscriber unit 10 is therefore a matter of network design choice, balancing the allocation of network services and quality of service provided to the user.

In the foregoing description much of the "intelligence" (i.e. data processing, decision making, etc.) is placed in the subscriber unit 10. There may be times when some of the intelligence could advantageously be placed with the network. One such situation would be in relation to message transmissions based on network loading. For example, there may be a network-driven need to reduce the transfer of data for data-centric applications during peak hours in order to maximize network capacity for voice traffic.

Although the network may define "peak" times as being between 7:00 am and 7:00 pm, there will, nevertheless, be short periods during the day when the load on the network is below a selected level, for example a loading that is less than average. These short periods may be used by the network to upload time-dependent SMS/MMS messages from the subscriber unit 10.

Figure 3:
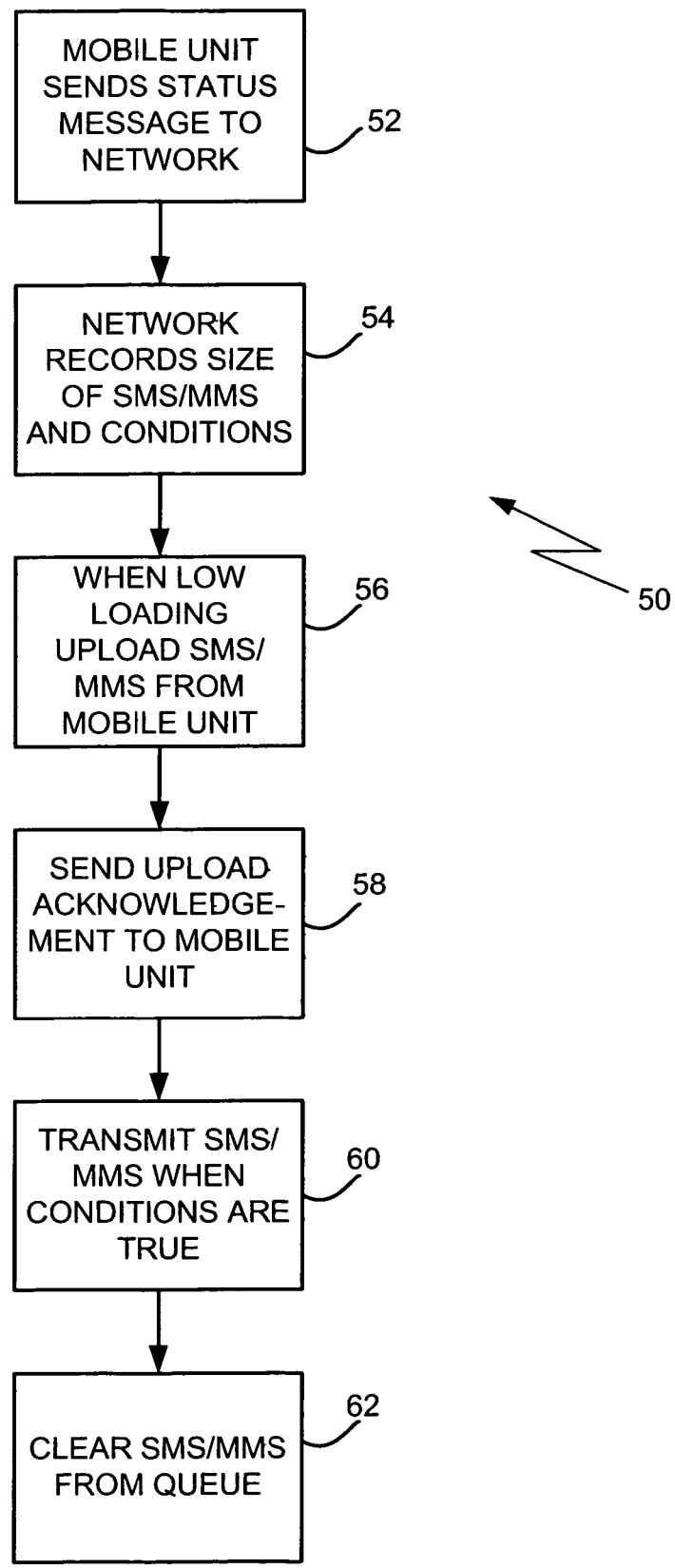
FIG. 3 is a flow diagram of the decisions by and interaction between the network and the subscriber unit during a network-dependent uploading of data.

FIG. 3 of the accompanying drawings is a flow diagram 50 of the decisions by and interaction between the network and the subscriber unit during a network-dependent uploading of data representing an SMS/MMS message. At stage 52, when a time-dependent message is created, the subscriber unit 10 sends a status message to the network identifying the size of the message, the desired time of transmission or other conditions and the intended destination for the SMS/MMS message. At stage 54, the network responds to the status message by recording the size of the SMS/MMS message and the conditions attached to the transmission of the message.

Since the network knows to which cell each subscriber unit 10 is attached, and knows how much data each subscriber unit has to transmit, the network can compute the total outstanding amount of data for each cell. In this way the network is able to decide, when sufficient resource becomes available, to allow the data to be transferred from the subscriber unit(s) to the network.

As represented by stage 56 in FIG. 3, the network prompts the subscriber unit 10 to upload the message (or parts of the message) during periods of less than average activity. The upload is triggered (in the subscriber unit 10) using a protocol message sent over a control channel in the network. The protocol message would simply instruct the subscriber unit 10 to proceed with the data transfer as network resource (i.e. capacity) is now available. The nature of control channels is determined by the standard applicable to the network. Depending on the standard relevant to the implementation, any one of: the paging channel, the broadcast channel or other control channels may be used to carry the protocol message.

Depending on the amount of resource available, the network could decide to upload the data in different ways. For example, the network could decide to upload:

(1) from specific subscriber units which may have large amounts of data or different types of data pending, since the status of every subscriber unit 10 is known to the network;
(2) from any subscriber unit assigned to a particular group of channels on a cell;
(3) from any subscriber unit on a particular sector of a cell;
(4) from any subscriber unit on a particular cell; or
(5) from any subscriber unit on a particular group of cells.
(6) based on the type of subscription The message is queued in a message server on the network (not shown) together with data defining the time of delivery for subsequent onward transmission to its intended destination. Once the uploading is completed, and as represented by stage 58 in FIG. 3, the network sends an upload acknowledgement signal to the subscriber unit. The subscriber unit reacts to the acknowledgement signal by marking the SMS/MMS message as sent and (if desired) clearing the message from its memory 42 (see FIG. 1).

When the conditions associated with the SMS/MMS message are true, and as represented by stage 60 in FIG. 3, the network sends the queued message on to the intended recipient. Thereafter, as shown in stage 62, the message is cleared from the queue in the server to free space in the server for other messages.

From the perspective of the network, this approach has the advantage of optimizing use of the network throughout the day, while avoiding unnecessary loading during periods of above average activity. From the perspective of the user, it offers the advantage of the transmission of data at off-peak rates.

The approach ensures that the message is uploaded ahead of time thereby ensuring that it will be delivered at the desired time. This also addresses some of the problems associated with message transmission when service is interrupted. Currently, in order to send and receive SMS/MMS messages the subscriber unit 10 must be in service. That is, it must be synchronized to a serving cell on a mobile network so that the message generated by the mobile user can be sent immediately. Moving the intelligence to the network will reduce the likelihood of message "calls" being dropped because of an interruption of service.

Figure 4:
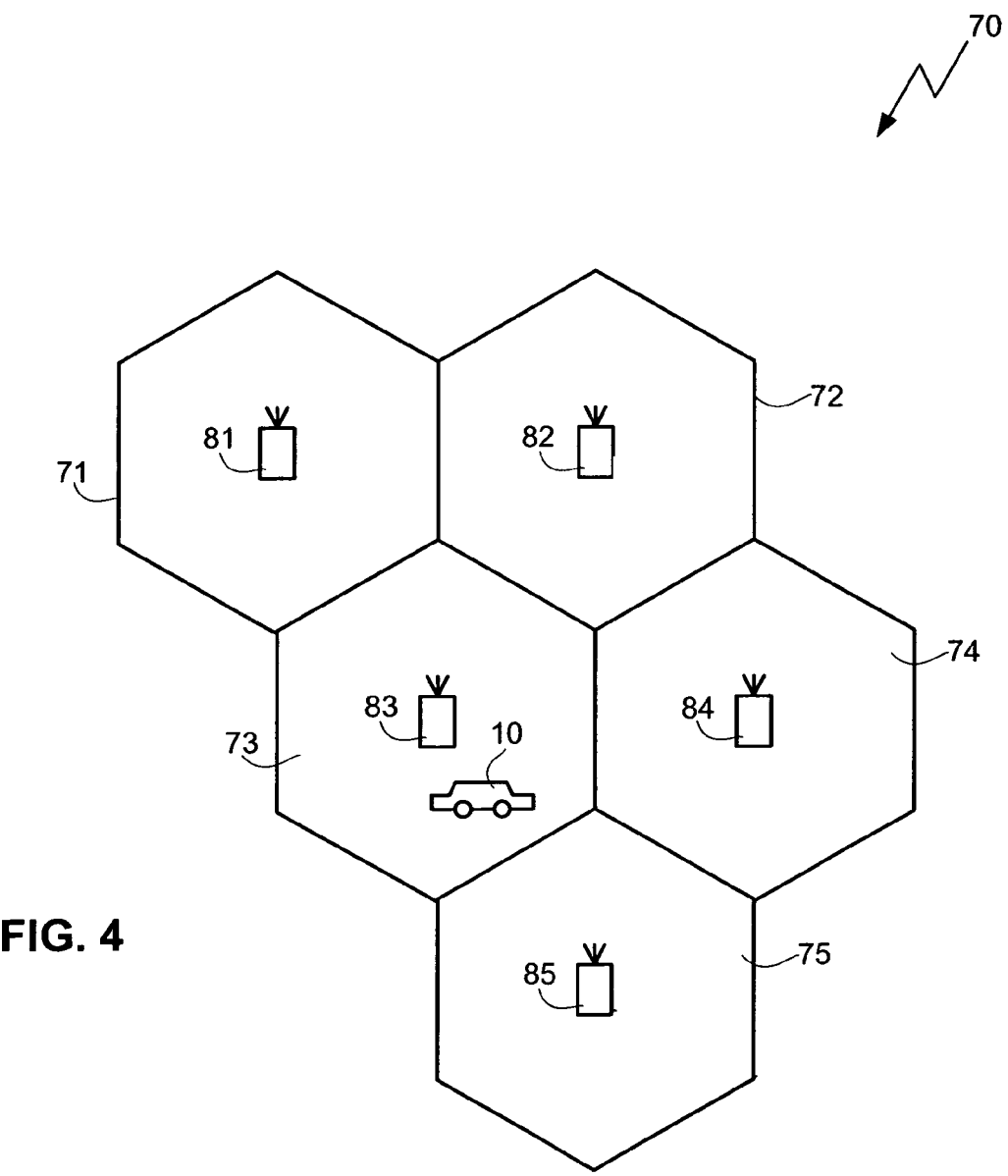
FIG. 4 is a schematic representation of cells in a cellular network.

The "proximity" condition requires the geographical location of the subscriber unit 10 to be known. There are several ways of doing this. FIG. 4 of the accompanying drawings is a schematic representation of a cellular network 70 in which a subscriber unit 10 is located.

The network 70 comprises multiple cells 71, 72, 73, 74, 75 that cover a service area. For the sake of convenience the cells 71 to 75 are shown as interlocking hexagons. This is an ideal representation and, in the real world, the shape of the cells will be determined by a whole host of environmental factors including relative signal strength, terrain, and even time of day. Each of the cells is served by a respective base station 81, 82, 83, 84, 85 which together with other equipment (not shown) form the network.

At its simplest level, the network knows at any instant in time the cell in which the subscriber unit 10 is located. This knowledge can be used to provide a coarse indication of location to the subscriber unit 10. This approach will not be very accurate; its resolution will depend on the size and spacing of cells within the network. Nevertheless, it may be sufficient to tell whether the subscriber unit 10 is located in a given village or town, which for some proximity conditions may be sufficient.

On a more sophisticated level, the mobile station may gather location information from the global positioning system (GPS), or even the Galileo system when it is eventually implemented. A GPS (or similar) receiver in the subscriber unit 10 requires good reception of GPS signals and a lot of processing power to calculate location. An alternative solution is the so-called Assisted GPS (AGPS) system in which the network comprises an assistance server that takes over some of the calculations necessary to determine the location of the subscriber unit 10.

Depending on the method used, "intelligence" for proximity-dependent messages may be placed in the subscriber unit 10 (as shown in FIG. 1), in the network (as already described in relation to other conditional messages) or in both the subscriber unit and the network. The following description assumes that the intelligence is in the subscriber unit 10 as shown in FIG. 1 of the accompanying drawings.

The position database 24 in the subscriber unit 10 (see FIG. 1) contains a previously-entered list of places (defined by their GPS coordinates) known to (or important to) the user. There are many different ways of inputting such data to position-locating devices, such as GPS receivers, and this aspect therefore need not be described in any further detail herein.

When the user creates a position-dependent message (i.e. a message whose transmission is dependent on the subscriber unit being located at a specific position or in a given region) the data is stored in the subscriber unit. The data processing and control unit 30 causes the message to be stored in the message memory 42 and information representing the position conditions to be stored in the user information database 44. Thereafter, the data processing and control unit 30 compares the information stored in the user information database 44 with the position data (current coordinates) held in the position database 24. When the conditions are met, the data processing and control unit 30 causes the message to be transmitted in the manner previously described hereinabove.

Having thus described the invention by reference to a preferred embodiment it is to be well understood that the embodiment in question is exemplary only and that modifications and variations such as will occur to those possessed of appropriate knowledge and skills may be made without departure from the spirit and scope of the invention as set forth in the appended claims and equivalents thereof.

What is claimed is:

1. A subscriber unit for a cellular communication system, comprising:
   a user interface for receiving a user generated message and a specified geographic condition for the transmission of the user generated message, wherein the specified geographic condition requires that the user generated message be transmitted by the subscriber unit when the subscriber unit is within a specified location;
   memory configured to store data representing the user generated message together with data representing the specified geographic condition associated with the transmission of the user generated message;
   a monitor configured to monitor a current location of the subscriber unit;
   a comparing unit configured to compare the specified geographic condition to a current condition of the subscriber unit to determine when the specified geographic condition is met; and
   a data processing unit configured to transmit over a radio link with a wireless network the stored user generated message when the monitor component determines that the associated specified geographic condition is met.

2. The subscriber unit of claim 1, wherein the specified geographic condition includes a time, the monitor is further configured to monitor a time of day.

3. The subscriber unit of claim 1, wherein the specified geographic condition includes a day, and the monitor is further configured to monitor a date as a part of the current condition.

4. The subscriber unit of claim 1, further comprising:
   a receiver for receiving signals from a cellular network; and
   a processor for decoding the received signals to extract data therefrom, for responding to the data when the extracted data represents control information, and for storing the data when the extracted data represents a message.

5. The subscriber unit of claim 1, wherein the user interface is responsive to a processor, for outputting an indication of arrival of a message.

6. The subscriber unit of claim 5, wherein the processor is responsive to user manipulation of the user interface to generate another message for transmission.

7. The subscriber unit of claim 6, further comprising:
   a transmitter for transmitting messages stored in the message store over a network; and
   wherein the processor is operable to transfer the data from the memory to the transmitter for transmission thereby.

8. The subscriber unit of claim 5, wherein the user interface comprises a display for displaying messages and a keypad.

9. The subscriber unit of claim 1, wherein the monitor further comprises a position processor for processing position signals received by a receiver to determine the current location of the subscriber unit.

10. The subscriber unit of claim 9, further comprising a separate position data receiver for receiving the position data.

11. The subscriber unit of claim 10, further comprising a position database in which position data representing the current location of the subscriber unit is stored.

12. The subscriber unit of claim 1, wherein the data processing unit is configured to transmit the stored user generated message based at least in part on one or more conditions specified by a network.

13. The subscriber unit of claim 1, further comprising:
   a placebook database for storing position information for a plurality of locations, wherein the position information includes position coordinates for each of the plurality of locations and an identifier for the plurality of locations.

14. The subscriber unit of claim 13, wherein the information for the placebook is preloaded.

15. The subscriber unit of claim 14, wherein the user interface is further configured to receive an identifier for the current location of the subscriber unit, and the placebook database is configured to store the position information and the corresponding identifier in the placebook database at the subscriber unit.

16. The subscriber unit of claim 1, wherein the user interface is further configured to receive a second condition to delay downloading of a file from the network until a specified time, and the processing unit is configured to delay downloading of the data until the specified time.

17. A method of preparing a message for transmission in a cellular communication system, comprising:
   receiving a user generated message and a specified geographic condition at a user interface of a subscriber unit, wherein the specified geographic condition requires that the user generated message be transmitted by the subscriber unit when the subscriber unit is within a specified location;
   storing data representing the user generated message in the subscriber unit together with data representing the specified geographic condition associated with the transmission of the user generated message;
   monitoring a current location of the subscriber unit;
   comparing the specified geographic condition to a current condition of the subscriber unit to determine when the specified geographic condition is met; and
   transmitting over a radio link with a wireless network the user generated message when the specified geographic condition is met.

18. The method of claim 17, wherein the specified geographic condition includes a time, and the method further comprises monitoring a time of day.

19. The method of claim 17, wherein the specified geographic condition includes a day, and the method further comprises monitoring a date.

20. The method of claim 17, further comprising:
   receiving signals from a cellular network;
   decoding the received signals to extract data therefrom;
   responding to the data when the extracted data represents control information; and
   storing the data when the extracted data represents a message.

21. The method of claim 17, further comprising outputting an indication of arrival of a message.

22. The method of claim 17, further comprising processing received position signals to determine the current location of the subscriber unit.

23. The method of claim 22, further comprising storing position data representing the current location of the subscriber unit.

24. The method of claim 17, further comprising enabling a network to specify the conditions.

25. The method of claim 17, further comprising:
storing position information for a plurality of locations in a placebook database at the subscriber unit, wherein the position information includes position coordinates for the plurality of locations and an identifier for the plurality of locations.

26. The method of claim 25, wherein the information for the placebook is preloaded.

27. The method of claim 25, further comprising:
receiving an identifier for the current location of the subscriber unit and storing the position information and the corresponding identifier in the placebook database at the subscriber unit.

28. The method of claim 17, further comprising:
receiving input to delay the downloading of a file from the network until a second specified condition is met; and
delaying downloading the file from the network until the second condition is met.

29. A method of transmitting a message in a cellular network, the method comprising:
generating message data at a subscriber unit, the message data representing a message to be transmitted;
storing the message data at the subscriber unit;
receiving, at the subscriber unit, condition data defining one or more specified conditions associated with the transmission, by the subscriber unit, of the message represented by the message data, wherein the condition data is defined in terms of the load on the cellular network;
storing the condition data in association with the message data;
monitoring loading on the cellular network;
determining when loading on the cellular network satisfies the condition data; and
transmitting, by the subscriber unit, the message represented by the message data when said one or more specified conditions are satisfied.

30. The method of claim 29, wherein the specified conditions include a time, and the method further comprises:
monitoring a time of day.

31. The method of claim 29, wherein the determining when loading on the cellular network satisfies the condition data comprises determining that loading on the cellular network is low.

32. The method of claim 29, wherein the specified conditions include a day, and the method further comprises:
monitoring a date.

33. The method of claim 29, wherein the specified conditions include a location, and the method further comprises monitoring the location of the subscriber unit.

34. The method of claim 29, further comprising enabling a user of the unit to specify the conditions.

35. The method of claim 29, further comprising enabling a network to specify the conditions.

36. The method of claim 29, further comprising:
receiving, at the subscriber unit, a periodic network-loading information message from the cellular network.

37. The method of claim 29, further comprising:
receiving input to delay the downloading of a file from the network until a second specified condition is met; and
delaying downloading the file from the network until the second condition is met.

38. An apparatus for transmitting a message in a cellular network, the apparatus comprising:
means for generating message data at a subscriber unit, the message data representing a message to be transmitted;
means for storing the message data at the subscriber unit;
means for receiving, at the subscriber unit, condition data defining one or more specified conditions associated with the transmission of the message represented by the message data by the subscriber unit, wherein the condition data is defined in terms of the load on the cellular network;
means for storing the condition data in association with the message data;
means for monitoring the loading on the cellular network;
means for determining when loading on the cellular network satisfies the condition data; and
means for transmitting, by the subscriber unit, the message represented by the message data when said one or more specified conditions are satisfied.

39. The apparatus of claim 38, wherein the specified conditions include a time, and the apparatus further comprises:
means for monitoring a time of day.

40. The apparatus of claim 38, wherein the means for determining when loading on the cellular network satisfies the condition data determines that loading on the cellular network is low.

41. The apparatus of claim 38, wherein the specified conditions include a day, and the apparatus further comprises:
means for monitoring a date.

42. The apparatus of claim 38, wherein the specified conditions include a location, and the apparatus further comprises means for monitoring the location of the subscriber unit.

43. The apparatus of claim 38, further comprising specifying means for enabling the conditions to be specified by a user of the unit.

44. The apparatus of claim 38, further comprising means responsive to conditions specified by a network.

45. The apparatus of claim 38, wherein the receiver is configured to receive a periodic network-loading information message from the cellular network.

46. A method of transmitting a message in a cellular network, the method comprising:
receiving a status message from a subscriber unit, the status message including the information regarding a message stored at the subscriber unit, the information including a size of the message and a specified condition for the transmission of the message for the subscriber unit;
storing the size and the specified condition of the message to be transmitted from the status message;
determining at the network when sufficient resources become available to upload the message stored at the subscriber unit to the network based on the network load level and the size of the message;
when sufficient resources are available at the network, uploading the message to be transmitted from the subscriber unit;
storing the message at the network;
associating the specified condition with the message;
determining when the specified condition has been met;
when the specified condition has been met, transmitting the message.

47. The method of claim 46, further comprising:
transmitting an upload acknowledgement to the subscriber unit after uploading the message.

48. The method of claim 46, further comprising:
clearing the stored message after transmitting the message.

49. The method of claim 46, further comprising:
receiving instructions to delay transmission of a file from the network to the subscriber unit until a second specified condition is met; and
delaying downloading the file to the subscriber unit until the second specified condition is met.

50. The method of claim 46, wherein the specified condition is an intended delivery time.

51. The method of claim 46, wherein the cellular network includes a plurality of cells, the method further comprising:
monitoring an amount of data for transmission in each of the plurality of cells; and
computing the total outstanding amount of data for transmission in each of the plurality of cells in order to determine when sufficient resources are available at the network.

52. The method of claim 46, further comprising:
transmitting a protocol message to the subscriber unit over a control channel when the cellular network has determined that sufficient resources are available in order to prompt the subscriber unit to upload at least a part of the message to the network.

53. The method of claim 52, wherein the control channel comprises at least one of a paging channel or a broadcast channel.

54. The method of claim 46, wherein the status message further includes an identifier of the type of data in the message, the method further comprising:
receiving status messages regarding messages from a plurality of subscriber units;
determining the amount of data and types of data at the plurality of subscriber units; and
when sufficient resources become available, determining to upload a message from one selected subscriber unit from among the plurality of subscriber units based on the amount of data at the selected subscriber unit or the type of data at the selected subscriber unit.

55. The method of claim 46, the method further comprising:
receiving status messages regarding messages from a plurality of subscriber units; and
when sufficient resources become available, determining to upload a message from one selected subscriber unit from among the plurality of subscriber units based on at least one of a channel in a cell to which the selected subscriber unit is assigned, a sector in a cell to which the selected subscriber unit is assigned, a cell to which the selected subscriber unit is assigned, or a subscription for the selected subscriber unit.

56. An apparatus for transmitting a message in a cellular network, comprising:
a receiver for receiving a status message from a subscriber unit, the status message including the information regarding a message stored at the subscriber unit, the information including a size of the message and a specified condition for the transmission of the message for the subscriber unit;
memory for storing the size and the specified condition of the message to be transmitted from the status message;
a determining unit for determining at the network when sufficient resources become available to upload the message stored at the subscriber unit to the network based on the network load level and the size of the message, and when sufficient resources are available at the network, initiating an upload of the message to be transmitted from the subscriber unit and storing the message at the network with an association to the specified condition; and
a transmitter for transmitting the message once the network determines that the specified condition has been met.

57. The apparatus of claim 56, further comprising:
an acknowledgement unit for initiating the transmission of an upload acknowledgement to the subscriber unit after uploading the message.

58. The apparatus of claim 56, wherein the network is configured to clear the stored message from the memory after transmitting the message.

59. The apparatus of claim 56, wherein the specified condition is an intended delivery time.

60. The apparatus of claim 56, wherein the cellular network includes a plurality of cells, the method further comprising:
a monitor for monitoring an amount of data for transmission in each of the plurality of cells and computing the total outstanding amount of data for transmission in each of the plurality of cells in order to determine when sufficient resources are available at the network.

61. The apparatus of claim 56, further comprising a control channel for transmitting a protocol message to the subscriber unit when the cellular network has determined that sufficient resources are available in order to prompt the subscriber unit to upload at least a part of the message to the network.

62. The apparatus of claim 61, wherein the control channel comprises at least one of a paging channel or a broadcast channel.

63. The apparatus of claim 56, wherein the status message further includes an identifier of the type of data in the message;
wherein the receiver is configured to receive a plurality of status messages regarding messages from a plurality of subscriber units; and
wherein the determining unit is further configured to determine the amount of data and types of data at the plurality of subscriber units and, when sufficient resources become available, to determine to upload a message from one selected subscriber unit from among the plurality of subscriber units based on the amount of data at the selected subscriber unit or the type of data at the selected subscriber unit.

64. The apparatus of claim 56, wherein the receiver is configured to receive a plurality of status messages regarding messages from a plurality of subscriber units; and
wherein the determining unit is configured to determine to upload a message from one selected subscriber unit from among the plurality of subscriber units based on at least one of a channel in a cell to which the selected subscriber unit is assigned, a sector in a cell to which the selected subscriber unit is assigned, a cell to which the selected subscriber unit is assigned, or a subscription for the selected subscriber unit, when sufficient resources become available.

65. A subscriber unit for a cellular communication system, comprising:
means for receiving a user generated message and a specified geographic condition for the transmission of the message, wherein the specified geographic condition requires that the user generated message be transmitted by the subscriber unit when the subscriber unit is within a specified location;
means for storing data representing the user generated message together with data representing the specified geographic condition associated with the transmission of the user generated message;

means for monitoring a current location of the subscriber unit;

means for comparing the specified geographic condition to a current condition of the subscriber unit to determine when the specified geographic condition is met; and means for transmitting over a radio link with a wireless network the stored user generated message when the monitor component determines that the associated specified geographic condition is met.

66. An apparatus for transmitting a message in a cellular network, the apparatus comprising:

a user interface for generating message data at a subscriber unit, the message data representing a message to be transmitted and for receiving condition data defining one or more specified conditions associated with the transmission, by the subscriber unit, of the message represented by the message data, wherein the condition data is defined in terms of the load on the cellular network;

memory for storing the message data for storing the condition data in association with the message data at the subscriber unit;

a monitor for monitoring loading on the cellular network;

a determining unit for determining when loading on the cellular network satisfies the condition data; and a transmitter for transmitting, by the subscriber unit, the message represented by the message data when said one or more specified conditions are satisfied.

67. The apparatus of claim 66, wherein the receiver is configured to receive a periodic network-loading information message from the cellular network.

68. The apparatus of claim 66, wherein the user interface is further configured to receive a second condition to delay downloading of a file from the network until a second specified condition is met, and the determining unit is configured to determine when the second specified condition is met.

69. An apparatus for transmitting a message in a cellular network, comprising:

means for receiving a status message from a subscriber unit, the status message including the information regarding a message stored at the subscriber unit, the information including a size of the message and a specified condition for the transmission of the message for the subscriber unit;

means for storing the size and the specified condition of the message to be transmitted from the status message;

means for determining at the network when sufficient resources become available to upload the message stored at the subscriber unit to the network based on the network load level and the size of the message, and when sufficient resources are available at the network initiating an upload of the message to be transmitted from the subscriber unit and storing the message at the network with an association to the specified condition; and means for transmitting the message once the network determines that the specified condition has been met.

\* \* \* \* \*